Sept. 8, 1970     J. I. WALLOVER     3,527,696
METHOD AND APPARATUS FOR RECLAIMING WASTE INDUSTRIAL OILS
Filed Dec. 17, 1969
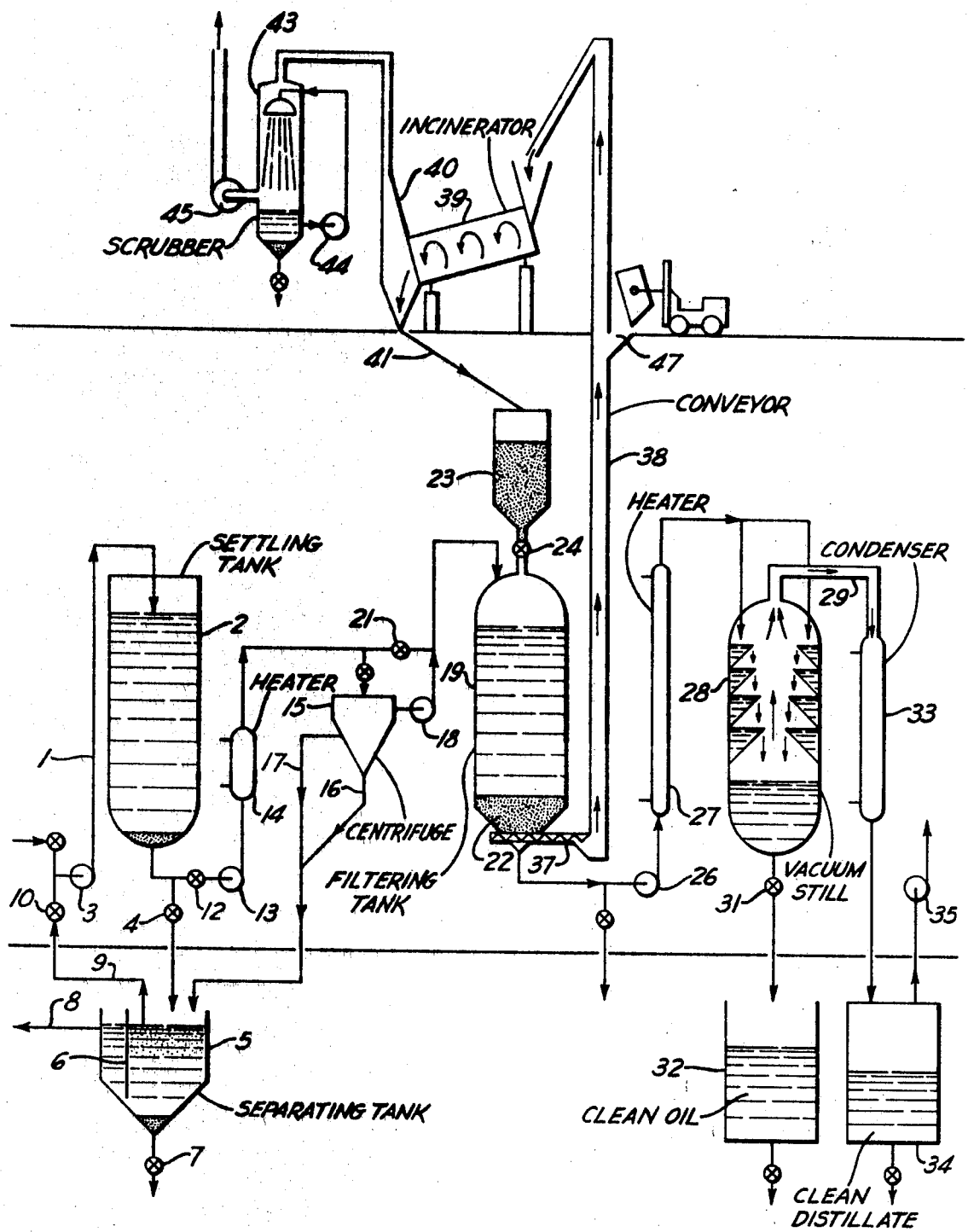
INVENTOR.
JAMES I. WALLOVER
BY
Brown, Murray, Flick & Peckham
ATTORNEYS.

United States Patent Office 3,527,696
Patented Sept. 8, 1970

3,527,696
METHOD AND APPARATUS FOR RECLAIMING WASTE INDUSTRIAL OILS
James I. Wallover, Beaver, Pa., assignor to Wallover Oil Company, East Liverpool, Ohio, a corporation of Ohio
Filed Dec. 17, 1969, Ser. No. 885,794
Int. Cl. C10m 11/00
U.S. Cl. 208—182          14 Claims

ABSTRACT OF THE DISCLOSURE

Waste industrial oil is filtered through a bed of activated earth to remove chemicals and extremely small foreign particles. The filtered oil is conducted away from the bed and to distilling apparatus if the oil contains distillates. Spent earth in the filter bed is removed periodically and passed through an incinerator to clean and reactivate it. Its place in the bed is taken by activated earth delivered from a substantially air-tight reservoir, to which reactivated earth from the incinerator is returned. The smoke produced by the incinerator is burned and the resulting gases are scrubbed to remove solids from them in order to provide clean air which can be delivered to the atmosphere. The solids are collected for suitable disposal.

---

There are various kinds of industrial oils, such as gear oil, hydraulic pressure oil, quenching oil, transfer oil, mineral spirits and kerosene. Some of these may contain chemical additions. These oils oxidize or otherwise deteriorate in use and must be replaced with fresh oil. Attempts in the past to reclaim the waste oil by reconditioning it have been too expensive and have produced problems of disposal of waste products removed from the oil. On the other hand, a much greater disposal problem is presented if reclamation is not attempted and the waste oil is merely dumped. Finding suitable places to safely dispose of waste oil is very difficult. Of course, it cannot be allowed to pollute rivers or lakes.

It is among the objects of this invention to provide a method and apparatus for reclaiming waste industrial oils, which solve the disposal problem, which are not unduly complicated, and the cost of which is reasonable so that it makes reclamation worthwhile.

The preferred embodiment of the invention is illustrated in the accompanying drawing, in which a diagrammatic view of a reclamation plant is shown.

Referring to the drawing, it is assumed that the waste industrial oil that is to be reconditioned or reclaimed contains distillates, chemicals and water, and solids in the form of foreign particles. The waste oil may be pumped from a storage tank through a line 1 to the top of a settling tank 2. After the tank has been filled the pump 3 is turned off and the oil in the tank is allowed to remain quiet for at least several hours. During this time water and solids settle to the bottom of the tank. At the desired time a valve 4 is opened below the tank to draw off most of the settled solids and water and deliver them to a separating tank 5. In this tank there is a vertical baffle 6 that divides the tank into a receiving chamber and a discharge chamber that are connected only through a passage beneath the baffle. Solids settle to the bottom of the tank and can be drawn off periodically through a valve 7 and then used for land fill or other purposes. Water will settle also and can be drawn off at 8 from the other side of the baffle and drained into a sewer, as it will be clean enough for that purpose. The fairly clean oil left in the separating tank can be conducted back through a line 9 and a valve 10 to the pump 3, which will recirculate it to the settling tank 2.

After solids and water have been drawn out of the settling tank through drain valve 4, that valve is closed and a valve 12 is opened that leads to a pump 13 which pumps oil from the settling tank through a heater 14 that may be a heat exchanger heated by steam. The oil is heated to a temperature of about 150° F. and is delivered to a centrifuge 15, where most of the remaining solids and water are separated from the oil. The settling solids and some of the water leave the bottom of the centrifuge through a pipe 16, and the rest of the water leaves through a lateral pipe 17. These two pipes may join and they empty into separating tank 5, where the solids and water again separate and are removed as explained above. Oil, now free of water and most solids, is removed from the upper part of the centrifuge by a pump 18 that delivers it to the top of a filtering tank 19.

When the waste oil does not contain water and solids or when most of those two elements are removed in the settling tank, the centrifuge can be bypassed through a valve 21 connecting the heater 14 with the outlet of pump 18. In either case, the oil, which still contains distillates and chemicals and perhaps fine solids, is delivered to the upper part of the filtering tank. In the bottom of the tank there is a bed 22 of granular filtering material that will remove chemicals and extremely small foreign particles from the oil. This material is an activated earth, such as fullers earth, bauxite or alumina for example. The filtering material for the bed is supplied from a substantially air-tight reservoir 23 mounted on top of the filtering tank and connected with it through a normally closed valve 24. For best results the activated earth should be of a size to pass through a 60 to 90 mesh screen. Finer material may plug the filter, while coarser material has a smaller total surface area and therefore requires more time for filtering.

The filtered oil is withdrawn from the bottom of the filtering tank by a pump 26 that pumps it through a heater 27 and into the top of a vacuum still 28, where the distillates in the oil separate and pass out of an outlet pipe 29 at the top of the still. The clean, reclaimed oil in the bottom of the still is drawn off through a valve 31 that leads to a suitable storage vessel 32. The vapors that leave the top of the still pass through pipe 29 through a condenser 33 and the resulting liquid distillate falls into a tank 34, the top of which is connected with a vacuum pump 35 that forms the vacuum in the still.

The main feature of this invention that makes the process economical and also avoids pollution problems is the provision for reconditioning or reactivating the spent activated earth in the filter bed so that it can be used over and over, thereby greatly reducing requirements for new filtering material and making it unnecessary to dispose of oil saturated material. Accordingly, suitable means, such as a screw conveyor 37 or the like, is provided for removing spent earth from the bottom of the filtering bed. This material is delivered to a conveyor 38 of any suitable form that will elevate it to a point above the filtering tank and discharge it into the upper end of an inclined rotary incinerator 39. In this incinerator carbonaceous material in the spent filtering material is burned out, thereby producing reconditioned or reactivated earth that is discharged from the lower end of the incinerator. This material and the products of combustion enter an afterburner 40, in which the products of combustion are burned as completely as possible. The hot reactivated earth, now as good as new, leaves the bottom of the afterburner through a conduit 41 and is delivered to the top of the storage reservoir 23 on top of the filtering tank. Since the activated earth in the reservoir is quite warm or hot, there is no danger of condensation on it, which would deleteriously affect the material. The temperature of the incinerator should be at least as high as about 1000° F. to burn the carbonaceous material out of the spent earth, but for fullers earth it should not go above about 1100° or it will destroy the filtering material. On the other hand, bauxite can be heated to 1600° F. without harming it.

The smoke from the after-burner enters the top of a scrubbing tower 43, where it is scrubbed with water pumped from the lower part of the tower by a pump 44 to remove solids and any chemicals from the smoke. The solids settle to the bottom of the tower and can be drawn off periodically and used for land fill or the like. The smoke, which is now clean air, is drawn out of the tower by an exhaust fan 45 that delivers it to the atmosphere.

Even though the activated earth is reused, some of it is lost in the operation and must be replaced occasionally. This can be done conveniently by providing the side of the vertical conveyor 38 with an opening 47, through which new activated earth can be dumped into the conveyor when required. This material will be heated in the incinerator and will threfore be hot and dry when it enters the storage reservoir.

It will be understood that with the process and apparatus disclosed herein, waste oil reclamation becomes feasible. The cost of activated earth, which has made earlier attempts at reclamation uneconomical, is greatly reduced because the earth can be reactivated repeatedly and therefore used over and over again. This reuse has the additional great advantage that it no longer is necessary to dispose of spent earth, which was a great problem because of the water pollution factor. The solids that are removed during my processing are clean and entirely suitable for land fill. Likewise, the removed water is clean enough to be acceptable in sanitary sewers, while the gases that are produced will not contaminate the atmosphere.

Although a batch operation has been described, it can be made continuous by using several settling tanks and shifting to another as soon as one is emptied.

I claim:

1. In the method of reclaiming waste industrial oils, the steps comprising filtering waste oil through a bed of activated earth to remove chemicals and extremely small foreign particles, conducting the filtered oil away from said bed, periodically removing spent earth from the bottom of the bed and incinerating it to clean and reactivate it, replacing spent earth removed from said bed with activated earth from a substantially air-tight reservoir, returning said reactivated earth to said reservoir, burning the smoke produced by said incinerating, scrubbing the gases produced by said smoke burning to provide clean air, delivering said air to the atmosphere and collecting solids scrubbed from the smoke for disposal.

2. In the method recited in claim 1, centrifuging said waste oil before it is filtered to thereby remove water and solids.

3. In the method recited in claim 2, first allowing some water and solids to settle out of said waste oil before the remainder of the waste oil is centrifuged.

4. In the method recited in claim 2, heating the waste oil before it is centrifuged.

5. In the method recited in claim 1, distilling said filtered oil to produce clean oil and clean distillate.

6. In the method recited in claim 5, heating said filtered oil before it is distilled.

7. In the method recited in claim 1, heating said waste oil and centrifuging it before it is filtered to thereby remove water and solids, heating the filtered oil and then distilling it to produce clean oil and clean distillate.

8. In the method of reclaiming waste industrial oils, the steps comprising holding a body of waste oil substantially motionless to allow solids to settle, periodically drawing off the settled solids and the remaining waste oil and heating the latter, centrifuging the heated oil to remove water and solids, delivering the water and solids to a separating tank, conducting the centrifuged oil to a bed of activated earth to filter out chemicals and extremely small foreign particles, conducting the filtered oil away from said bed and reheating the oil, distilling the reheated oil to produce clean oil and distillate, collecting the clean oil and distillate, periodically removing spent earth from said bed and incinerating it to clean and reactivate it, replacing spent earth removed from said bed with activated earth from a substantially airtight reservoir, returning said reactivated earth to said reservoir, burning the smoke produced by said incinerating, scrubbing the gases produced by said smoke burning to provide clean air, delivering said air to the atmosphere and collecting scrubbed solids from the smoke for disposal.

9. In the method recited in claim 8, returning to said body of waste oil any oil separating in the separating tank.

10. Apparatus for reclaiming waste industrial oils, comprising a filtering tank containing a bed of activated earth, means for delivering waste oil to the tank, means for conducting filtered oil away from the tank, an incinerator, means for periodically conveying spent earth from the bottom of the bed to the incinerator, a substantially air-tight reservoir of activated earth communicating with the upper part of said tank for replacing the sent earth removed therefrom, means for conveying reactivated earth from the incinerator to said reservoir, means for burning the smoke from the incinerator, and means for scrubbing the gases emitted from said smoke-burning means.

11. Apparatus according to claim 10, including a centrifuge for separating water and solids from said waste oil before it reaches said filtering tank.

12. Apparatus according to claim 10, in which said oil delivering means include a settling tank and a centrifuge connected in series with the filtering tank, whereby to remove water and solids before the oil reaches the tank.

13. Apparatus according to claim 12, including a separating tank, and means for conducting water and solids from said settling tank and centrifuge to the separating tank.

14. Apparatus according to claim 10, including means connected with said oil conducting means for receiving and distilling said filtered oil to produce clean oil and distillate.

References Cited

UNITED STATES PATENTS

| | | | |
|---|---|---|---|
| 1,250,526 | 12/1917 | Swan | 208—182 |
| 2,014,044 | 9/1935 | Haswell | 55—85 X |
| 2,320,106 | 5/1943 | South | 208—180 |
| 2,324,763 | 7/1943 | Carruthers | 210—73 |
| 3,169,917 | 2/1965 | Kahan | 208—182 X |

SAMIH N. ZAHARNA, Primary Examiner